United States Patent
Kochs et al.

[11] Patent Number: 5,908,148
[45] Date of Patent: Jun. 1, 1999

[54] DEVICE FOR FITTING RIVETS, BUTTONS OR THE LIKE

[75] Inventors: Karl-Josef Kochs, Baesweiler; Hans-Dieter Kopatz, Alsdorf, both of Germany

[73] Assignee: William Prym GmbH & Co. KG, Stolberg, Germany

[21] Appl. No.: 08/809,657

[22] PCT Filed: Jun. 22, 1995

[86] PCT No.: PCT/EP95/02434

§ 371 Date: Jun. 2, 1997

§ 102(e) Date: Jun. 2, 1997

[87] PCT Pub. No.: WO96/07338

PCT Pub. Date: Mar. 14, 1996

[30] Foreign Application Priority Data

Sep. 8, 1994 [DE] Germany .............................. 44 31 948

[51] Int. Cl.⁶ .................................................. A41H 37/10
[52] U.S. Cl. .............................. 227/30; 227/37; 227/18; 227/135; 227/149
[58] Field of Search ................................ 227/30, 31, 37, 227/15, 18, 135, 149

[56] References Cited

U.S. PATENT DOCUMENTS

| | | | |
|---|---|---|---|
| 4,199,094 | 4/1980 | Birkhofer | 227/37 |
| 4,343,423 | 8/1982 | Sauermilch | 227/1 |
| 4,541,558 | 9/1985 | Herten | 227/7 |
| 4,598,468 | 7/1986 | Yoshieda | 29/716 |
| 4,606,487 | 8/1986 | Douri | 227/8 |
| 4,645,110 | 2/1987 | Taga | 227/2 |
| 4,703,882 | 11/1987 | Herten | 227/8 |
| 4,724,990 | 2/1988 | Yoshieda | 227/8 |
| 4,741,466 | 5/1988 | Birkhofer | 227/4 |
| 4,789,089 | 12/1988 | Toyota | 227/15 |
| 5,014,895 | 5/1991 | Ito | 227/8 |
| 5,501,001 | 3/1996 | Kamps | 29/788 |

FOREIGN PATENT DOCUMENTS

| | | |
|---|---|---|
| 0208317 | 1/1987 | European Pat. Off. . |
| 0222595 | 5/1987 | European Pat. Off. . |
| 3313351 | 10/1984 | Germany . |
| 9312680 | 7/1993 | WIPO . |

*Primary Examiner*—Scott A. Smith
*Assistant Examiner*—James P. Calve
*Attorney, Agent, or Firm*—Martin A. Farber

[57] ABSTRACT

A device for fitting articles including rivets, buttons and the like, to a fabric, comprising a lower tool serving as an abutment for an article, and a ram executing a riveting stroke. A lower end of the ram joins with an upper tool for impinging upon an upper portion of the article and for urging the article against the lower tool upon execution of the riveting stroke. A rotatably driven cam disc urges an upper end of the ram for controlling travel movement of the ram. A clamp is carried by the bottom end of the ram for movement in synchronism with the ram. For finger protection, the device is operative to stop the clamp in a position spaced from the lower tool during a first lowering movement.

12 Claims, 17 Drawing Sheets

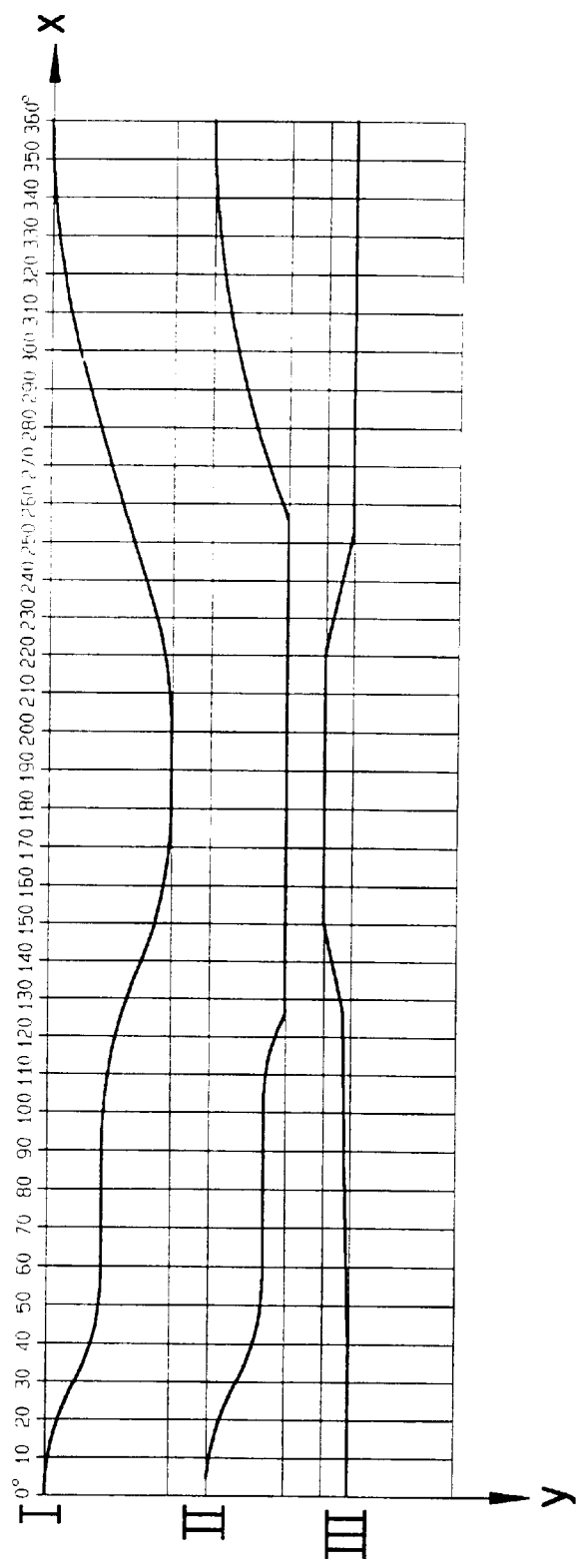

DEVICE FOR FITTING RIVETS, BUTTONS OR THE LIKE

FIELD AND BACKGROUND OF THE INVENTION

The invention relates to a device for fitting rivets, buttons or the like, which consist of an article lower-portion and an article upper-portion, to a fabric or the like, with a lower tool serving as abutment for the article lower-portion and a ram executing the riveting stroke, the lower end of which ram forms an upper tool impinging upon the article upper-portion and the upper end of which ram cooperates with a rotatingly driven cam disc controlling the travel movement, and with jaws displaceable in the direction of movement of the ram, which jaws, in order to provide a finger protecting function, stop in a position spaced from the lower tool after a first lowering movement, an electrical switch being actuated during this first lowering movement, actuation of the switch stopping the device if the spaced position is not reached, and which switch, after the spaced position is reached, permits the subsequent second lowering movement of the jaws.

A device of the kind in question is known from DE 33 13 351C2, a cam plate and a cam disc being keyed onto the drive shaft of a motor, disposed axially one after the other. The upper end of a ram engages, spring-biased, against the circumferential surface of the cam plate, while a roller of a linkage consisting of an upper rod and a lower rod engages on the face-side track of the cam disc. The lower rod is a carrier for the jaws. A tension spring acts on the upper rod, which spring biases the roller into a position of engagement against the inner surface of the track. A further tension spring acts in the sense of moving the upper rod and lower rod apart from one another. Each rod carries one contact of a switch, which contacts are held in a position of engagement by one of the tension springs. By switching on the motor, both the ram and the jaws are displaced in a downward direction. If the jaws cannot move downwards to their first spaced position, the finger protecting spacing cannot therefore be complied with, the jaws with the lower rod thus stop, while the upper rod, cam-driven, moves further downwards. The contacts of the switch open thereupon and instantaneously stop the drive. If, on the contrary, the finger protecting spacing is complied with, the downward drive is not interrupted.

SUMMARY OF THE INVENTION

An object of the invention providing a device of the type in question in a simpler manner, to be less susceptible to wear and at lower cost, while retaining the proven design and a reliable sequence of functions.

According to the invention, in a device with the introductory-mentioned features, this task is solved in a device with the features of claim 1, the ram, stopping for a brief period between a first and a second lowering movement, takes the jaws along with it in identical movement over its entire downward path, the jaws, in a single-sided free movement in relation to the ram, being coupled to the ram against the force of a spring, which spring is loaded either on application of the jaws to the fabric or when the finger protecting function is triggered, along with a relative movement between ram and jaws and a switch actuation.

As a result of an embodiment of this kind, there is provided a device of especially simple design and high reliability for fitting rivets, buttons or the like. On account of the jaws which are taken along by the ram in identical movement during its downward stroke, one single cam plate or cam disc only suffices to drive both the ram and the jaws. There is thus provided a single-sided free movement of the jaws on the ram, in such a way that the jaws stop after application to the fabric or on triggering of the finger protecting function, while the ram is displaced further in a downward direction. This relative movement results in a switch actuation, upon which the drive of the device stops immediately when the finger protecting spacing is not complied with. The spring force then acting on the jaws is chosen so that, for example, on impingement upon a finger, no injuries are caused to same. The number of components for the drive and for the finger protecting function may be kept low, associated with low-cost manufacture of the device. There also results a low-wear construction and thereby, high reliability, especially in respect of the finger protecting function. The design of suitable devices, proven in itself, may also be retained. Once the jaws have reached their first position spaced from the lower tool, the drive is continued and the article upper-portion and article lower-portion are joined together with interposition of the fabric. The entrainment, identical in movement, of the jaws by the ram further permits, in simplest manner, the jaws to be halted for a brief moment on reaching the spaced position. This takes place in that the ram stops and transfers this standstill condition correspondingly to the jaws. The standstill condition for a brief moment may be realized, in this connection, by appropriate shaping of the curved path of the cam plate.

An advantageous development of the device is characterised in that the contacts of the switch formed as a contact breaker are associated, on one side, with the jaws and, on the other side, with the ram. As soon as the jaws stop their downward stroke, there occurs the aforementioned relative displacement between jaws and ram, so that the contacts of the switch which are associated with the jaws and ram open and accordingly stop the downward drive in the event of non-compliance with the finger protecting spacing.

The fact that the spring is formed as a helical compression spring encircling the ram contributes to a space-saving arrangement. One of the ends of the spring engages against the jaws, while the other end abuts against a radial shoulder of the ram.

A standstill of the ram and jaws of sufficiently great extent is achieved by the spaced position provided between the two lowering movements extending over about 30° within a 360° rotation per movement cycle of the cam disc.

It is further to be emphasised that a by-pass switch may be provided on the machine stand, which is actuated by the ram at the beginning of the second lowering movement. If the ram drive is continued after the first spaced position is reached, actuation of the by-pass switch on the machine stand results along with this continued drive by means of a control cam on the ram, so that even after application of the jaws to the fabric and relative displacement of the ram in relation to the jaws, combined with the opening of the switch associated with these components, the by-pass switch maintains the circuit to the motor and the operation of the machine may be continued.

Furthermore, there results a structural simplification of the device by providing slide displacement of a loading slide, derived from the movement of the ram. This loading slide is fitted with a lower slide and an upper slide, to slide both an article lower-portion and an article upper-portion into the tools associated with them.

It proves constructionally simple, in this connection, for the slide displacement to be effected by means of a lever, which guides a sliding block in a slide slot, which sliding block, for its part, is displaceable in a slide guide on the machine stand.

A further function is fulfilled by the aforementioned lever in that the pivoting of the lever drives the rotational movement of a drive lever for a lower-tool displacement, an arm of a transfer lever following a drive cam of the drive lever. The lower-tool displacement is utilised to execute a movement in the opposite direction to the ram, which movement serves to push serrations of the article lower-portion, which, for example, is provided with serrations, through the fabric, to constitute, thereafter, an abutment during the riveting operation.

In this connection, it proves advantageous for the upward movement of the lower tool to begin approximately with the application of the jaws to the fabric and to be ended before the lowest position of the ram is reached. The jaws thus constitute the abutment when pushing through the fabric by means of the article lower-portion. It is then to be emphasised that an upward positioning movement of the lower tool is provided before the upward movement of the lower tool, substantially simultaneously with the standstill condition of the jaws and ram.

So that during the riveting process, forces exceeding the required riveting force do not result in damage to the device, the lower tool is downwardly spring-mounted by means of the transfer lever.

Finally, an advantageous feature is further provided in that a sliding portion of the jaws is mounted to be axially displaceable on the ram. Thus, no additional guide is provided for the jaws, in that the ram takes over the guiding function for the sliding portion of the jaws.

BRIEF DESCRIPTION OF THE DRAWINGS

With the above and other objects and advantages in view, the present invention will become more clearly understood in connection with the detailed description of a preferred embodiment, when considered with the accompanying drawings of which, FIG. 17 shows a movement diagram for the ram, the jaws and the lower tool.

DETAILED DESCRIPTION OF THE PREFERRED EMBODIMENT

Figure 1:
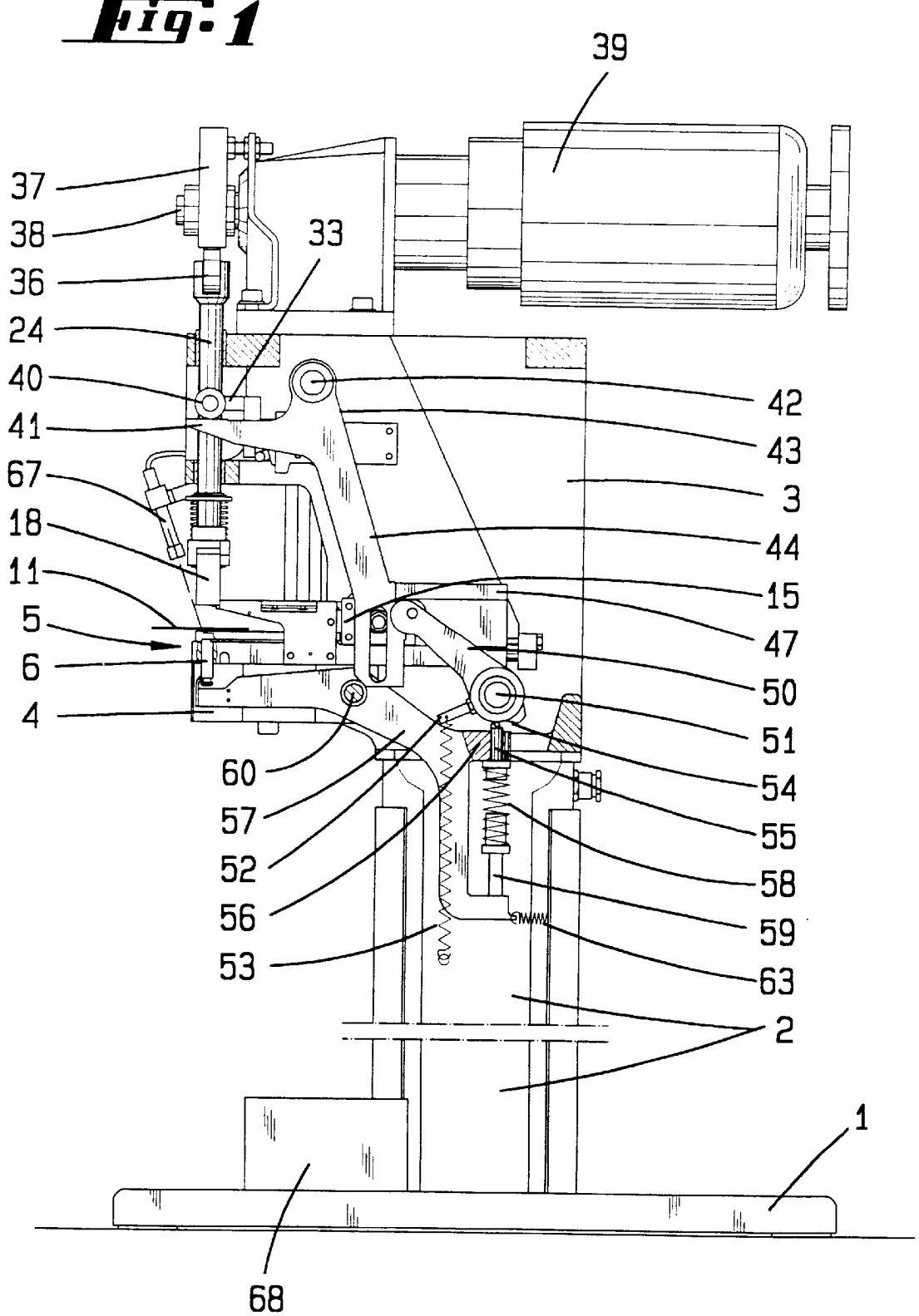
FIG. 1 shows, partly in side view, partly in horizontal section, the device in the top dead centre position of the ram.
Figure 2:
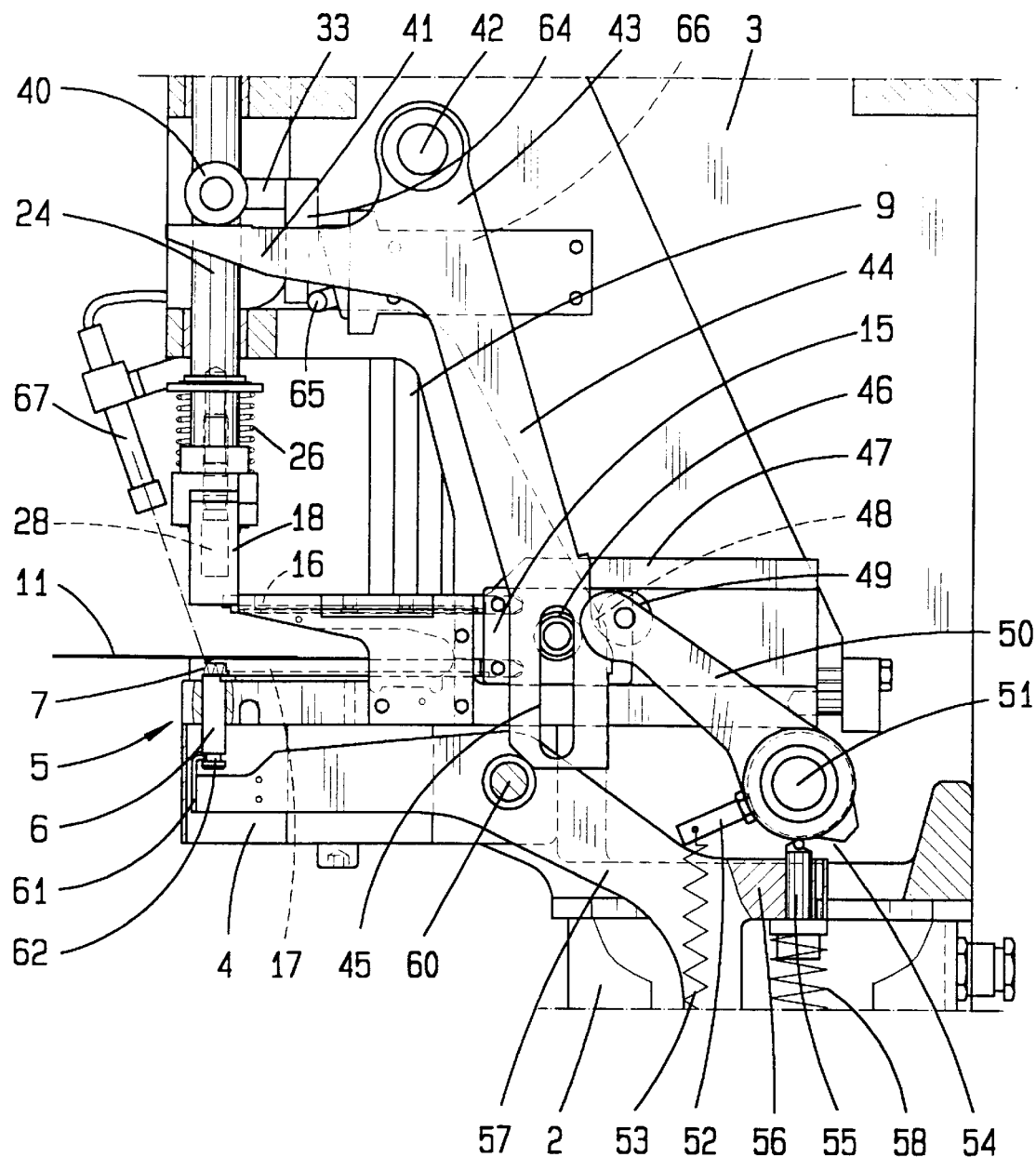
FIG. 2 shows part of the device in the region of the lower tool and of the upper tool, likewise in the top dead centre position of the ram.

The device provided in the form of a machine has a vertically aligned stand 2 carried by a base plate 1. The stand 2 is carrier for a mounting plate 3. The mounting plate 3 is of U-shape, tilted through 90° in anticlockwise direction, the lower arm of the U defining a bracket 4. At its free end, the bracket 4 holds a lower tool 5. The lower tool 5 has an anvil 6 which is circular in cross-section, the upper end of the anvil receiving an article lower-portion 7. The article lower-portions 7 are stored in a magazine 8 disposed to the side of the mounting plate 3, from which magazine 8 there extends a parts feeding rail 9, directed downwards obliquely towards the bracket 4. In regard to the article lower-portions 7, there are in question holding portions provided with serrations, which holding portions may be brought into connection with two different article upper-portions. One, 10, of the article upper-portions is represented. It serves as a functional portion and may be fitted, with the article lower-portion 7, to a fabric 11. Both differently-formed article upper-portions reach the region of a loading slide 15 from magazines 12, 13 disposed opposite the magazine 8, by way of a common parts feeding rail 14. The loading slide 15 is horizontally displaceable and is provided with an upper push bar 16 and a lower push bar 17. The upper push bar brings each article upper-portion 10 into a clamp or jaws 18, while the lower push bar 17 moves the article lower-portion 7 into a position aligned with the anvil 6 of the lower tool 5. By means of an electromagnetic control not illustrated, either the one or the other article upper-portion 10 may be brought into the displacement region of the upper push bar 16.

The jaws 18 extend, in the initial position of the device, in a position aligned with and opposite to the lower tool 6. The jaws 18 are formed by two jaw members 19, 20, which, at their upper ends, are displaceable about pins 21. A tension spring, not represented, biases the jaw members 19, 20 against one another. At their lower end, the jaw members 19, 20 define a receiver 22 for an article upper-portion 10. The article upper-portion is brought into this receiver 22 by means of the upper push bar 16. The pins 21 and therewith the jaws 18 are carried by a slide block 23, which is guided at the lower end of a ram 24 extending in a position opposite to the lower tool 5. The downward movement of the slide block 23 is limited by a radial shoulder 25 at the lower end of the ram 24. A helical compression spring 26 encircling the ram 24 above the slide block 23 biases the jaws 18 downwards. The upper end of the helical compression spring 26 engages likewise against a radial shoulder 27 of the ram 24, which radial shoulder is disposed at a spacing from the lower radial shoulder 25. The helical compression spring 26 serves as a finger protecting spring and prevents the jaws from injuring, for example, a finger extending between the jaws and the lower tool when the jaws are applied against the finger. At its lower end, the ram 24 carries an upper tool 28, which, in the top dead centre position of the ram according to FIGS. 1–4, ends above the receiver 22 for the article upper-portion 10.

The slide block 23 furthermore carries a push rod 29 projecting above it and guided in the mounting plate 3. The upper end of the push rod 29 is fitted with a contact 30 for a switch 31. The upper contact 30 cooperates with a lower contact 32 of the switch 31. In the top dead centre position of the ram 24 shown in FIGS. 1–4, the switch 31 is actuated which means that both contacts 30, 32 come against one another. The upper contact 30 contains a compression spring, not illustrated, which biases the contact projection towards the contact projection of the lower contact 32. There is thus provided a limited displaceability of the upper contact projection. The lower contact 30 is carried by a bracket 33 secured to the ram 24. In a position opposite to the contact 32, a compression spring 34 engages against the bracket 33, which compression spring 34, for its part, is disposed in a sleeve 35 on the machine stand.

At the upper end, the ram 24 carries a roller 36. Under the action of the compression spring 34, the roller 36 engages against the circumferential surface of a cam disc 37. The cam disc is keyed to the drive shaft 38 of an electric motor drive 39. During a 360° rotation of the cam disc 37, the ram 24 is correspondingly displaced downwardly and again upwardly into the top dead centre position.

The bracket 33 furthermore carries a drive roller 40. An arm 41 of a lever 43 engages against the underside of this drive roller 40, lever 43 being journalled on the mounting plate 3 by means of the pivot pin 42. The lever 43 provides an obliquely downwardly directed lever arm 44 in an obtuse-angled orientation to the arm 41. The end of the lever arm 44 extends vertically, in the position of FIGS. 1–4, and the lever arm is provided there with a vertical slot 45, in which there engages a sliding block 46. The sliding block 46 is connected to the slide-form loading slide 15 which, for its part, is displaceable in a slide guide 47 of the machine stand when the lever 43 pivots. The lower end of the lever arm 44 defines a drive edge 48, against which there engages a follower roller 49. The follower roller 49 is disposed at the free end of a drive lever 50. The drive lever 50 is mounted on a pin 51 of the machine stand. A tension spring 53 engages a transverse arm 52 of the drive lever 50, which tension spring 53 biases the drive lever 50 towards an engagement position on the lever 43. The lever 43, with its arm 42, is accordingly forced into an engagement position on the drive roller 40 of the ram 24.

In a position opposite to the follower roller 49, the drive lever 50 provides a drive cam 54 disposed adjacent to the pin 51, which drive cam 54, for its part, cooperates with a follower pin 55 secured against twisting, which pin 55 is guided in a laterally projecting transverse arm 56 of a transfer lever 57. The follower pin 55 is supported by way of a transfer compression spring 58 on a thread-adjustable counter-pin 59 at the lower end of the substantially angularly-shaped transfer lever 57. In the point of the angle, the transfer lever 57 is journalled on a transverse pin 60 on the bracket. The free end of the transfer lever 57 extends to beneath the lower tool 5. An angle piece 61 of the transfer lever 57 engages positively in an annular groove 62 at the lower end of the anvil-form lower tool 5. A restoring spring 63 acting adjacent to the counter-pin 59 biases the transfer lever 57 in such a way that its follower pin 55 engages against the drive lever 50, namely, according to FIGS. 1–4, in the region in advance of the drive cam 54.

The bracket 33 is then carrier of a drive strip 64, which cooperates with the contact switch 65 of a by-pass switch 66 secured to the machine stand.

A projection lamp 67 serves for precise placement of the article portions on the fabric. This projection lamp 67 is fixed to the machine stand, and produces a cross-hairs, for example on the upper side of the fabric.

There ensues the following mode of operation:

According to FIGS. 1–4, the ram 24 takes up the top dead centre position, by virtue of corresponding rotation of the cam disc 37. An article upper-portion 10 has been transferred to the jaws 18 by the upper push bar, while the lower push bar 17 has brought the article lower-portion 7 into the lower tool 5.

Figure 3:
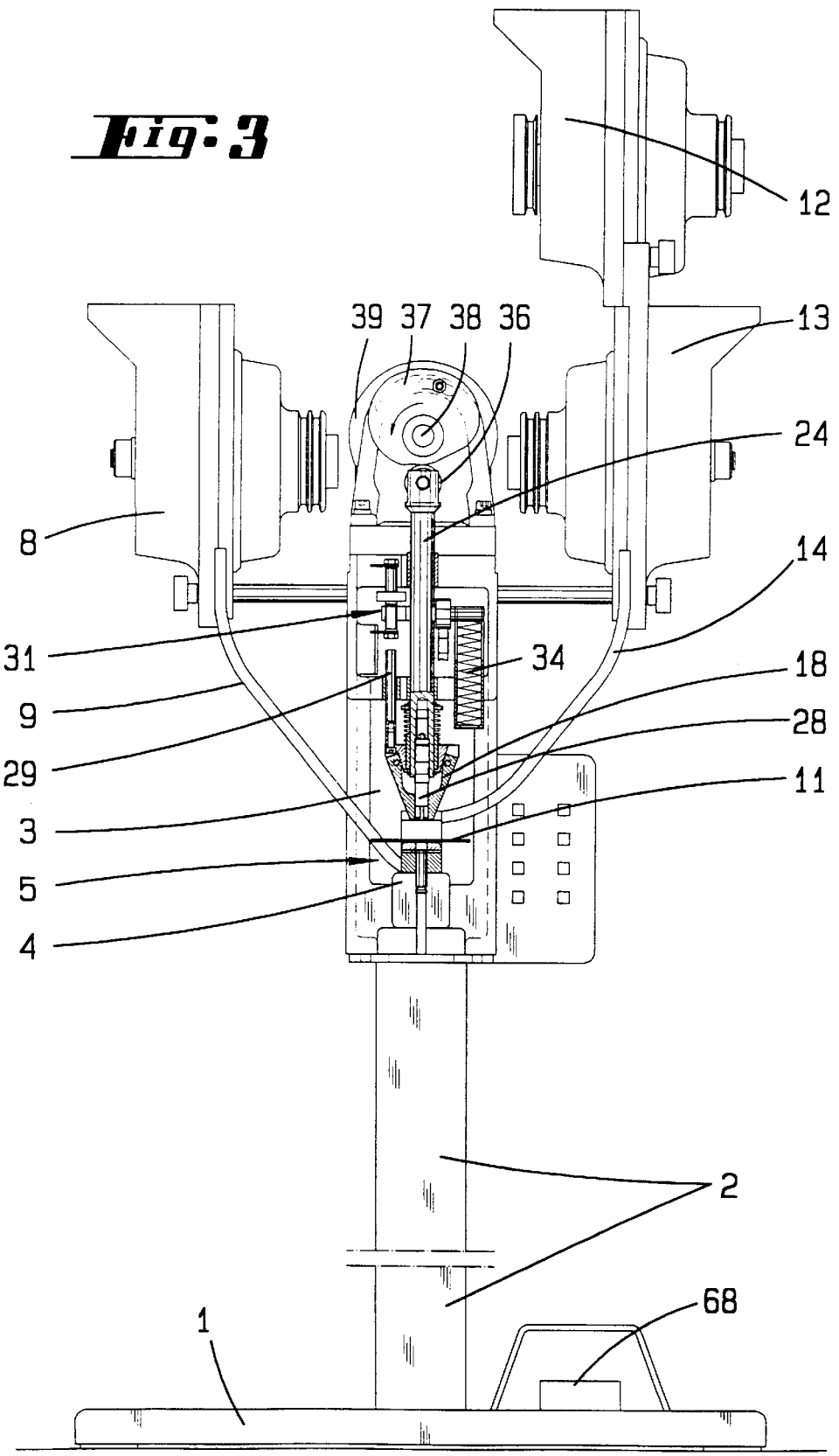
FIG. 3 shows a front view of FIG. 1, the magazines being shown.
Figure 4:
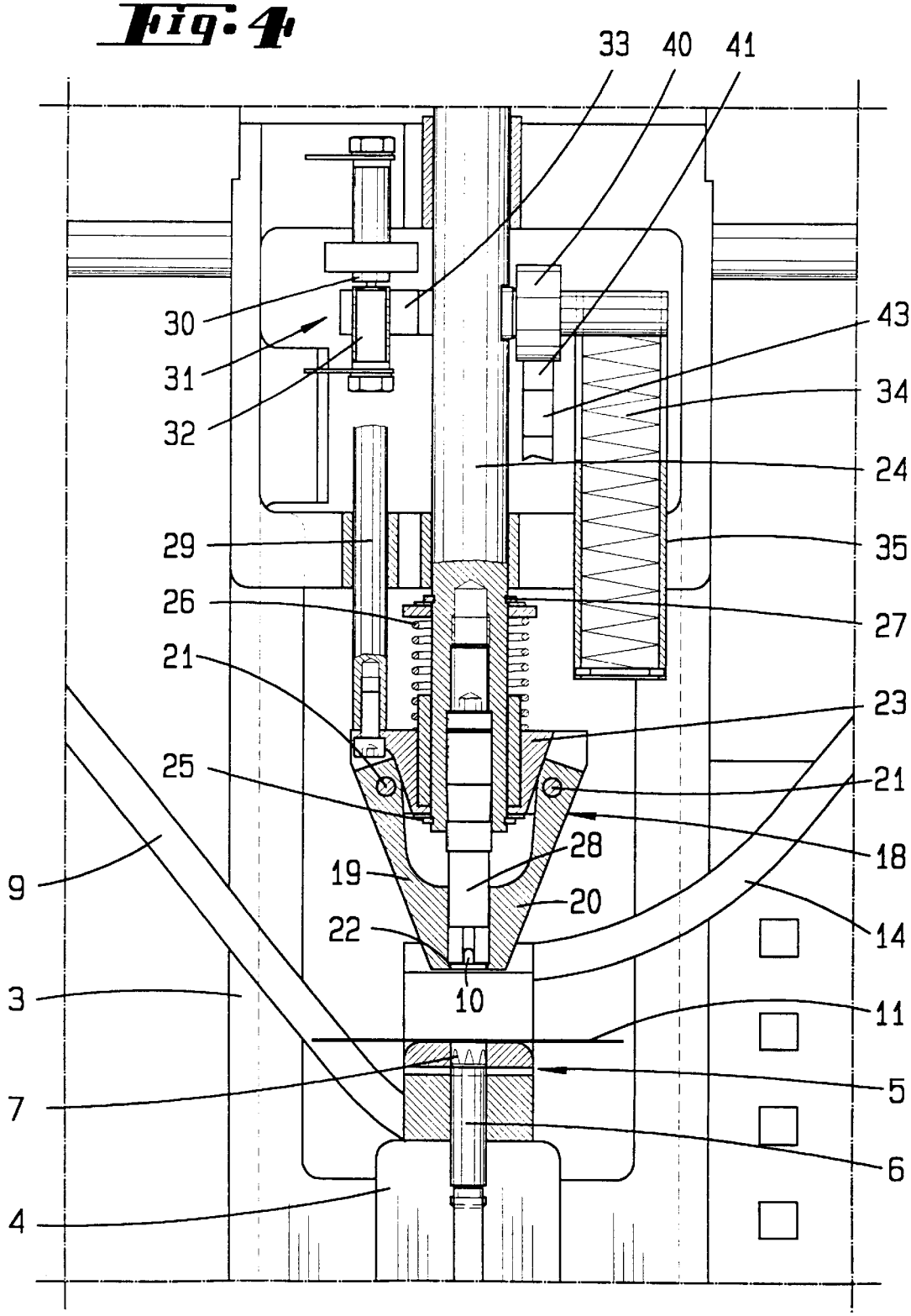
FIG. 4 shows the device, partly in front view, partly in vertical longitudinal section, for the top dead centre position of the ram.
Figure 5:
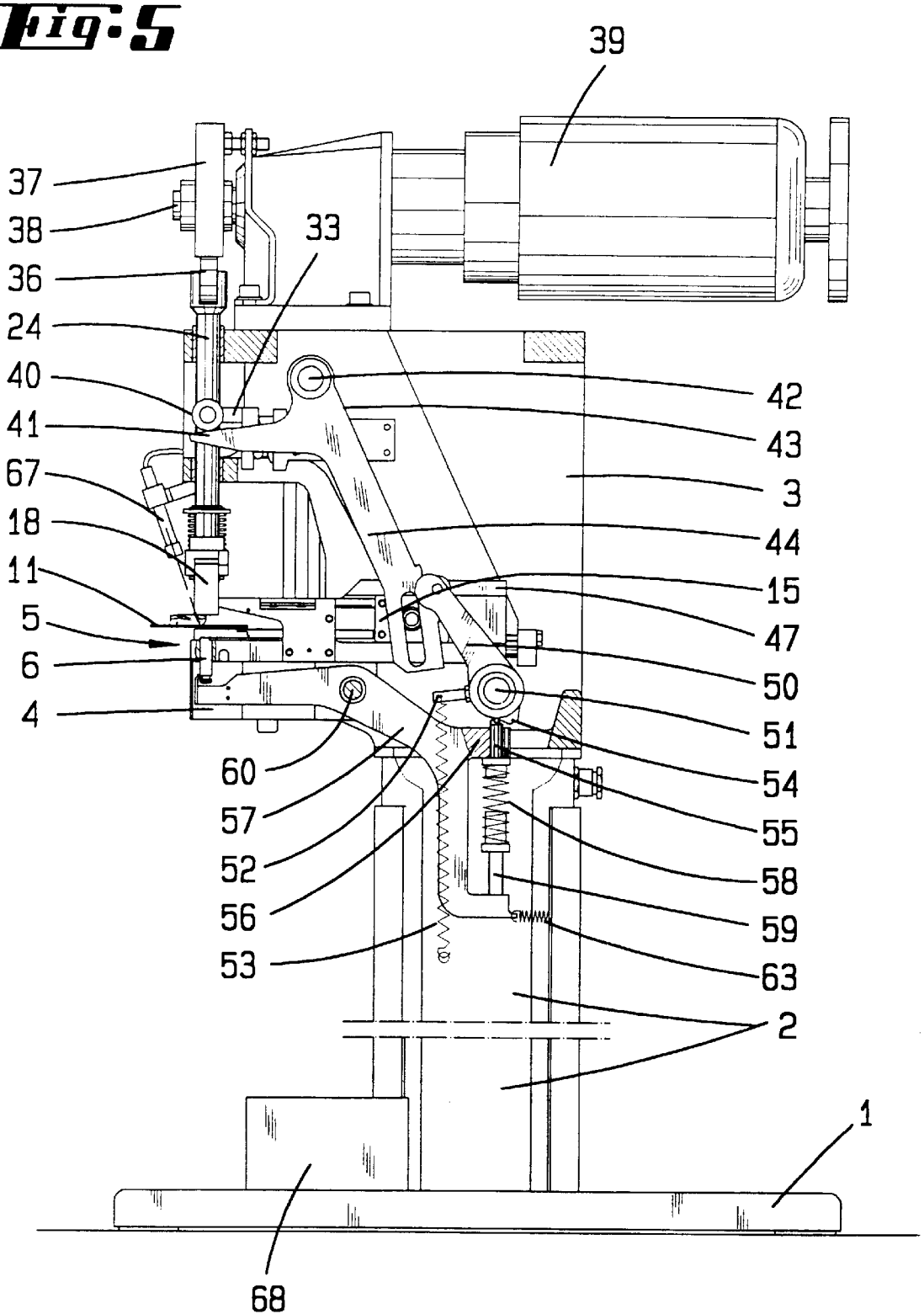
FIG. 5 shows a representation corresponding to FIG. 1, jaws and ram having been displaced downwards, with an operative's finger extending between jaws and fabric.
Figure 6:
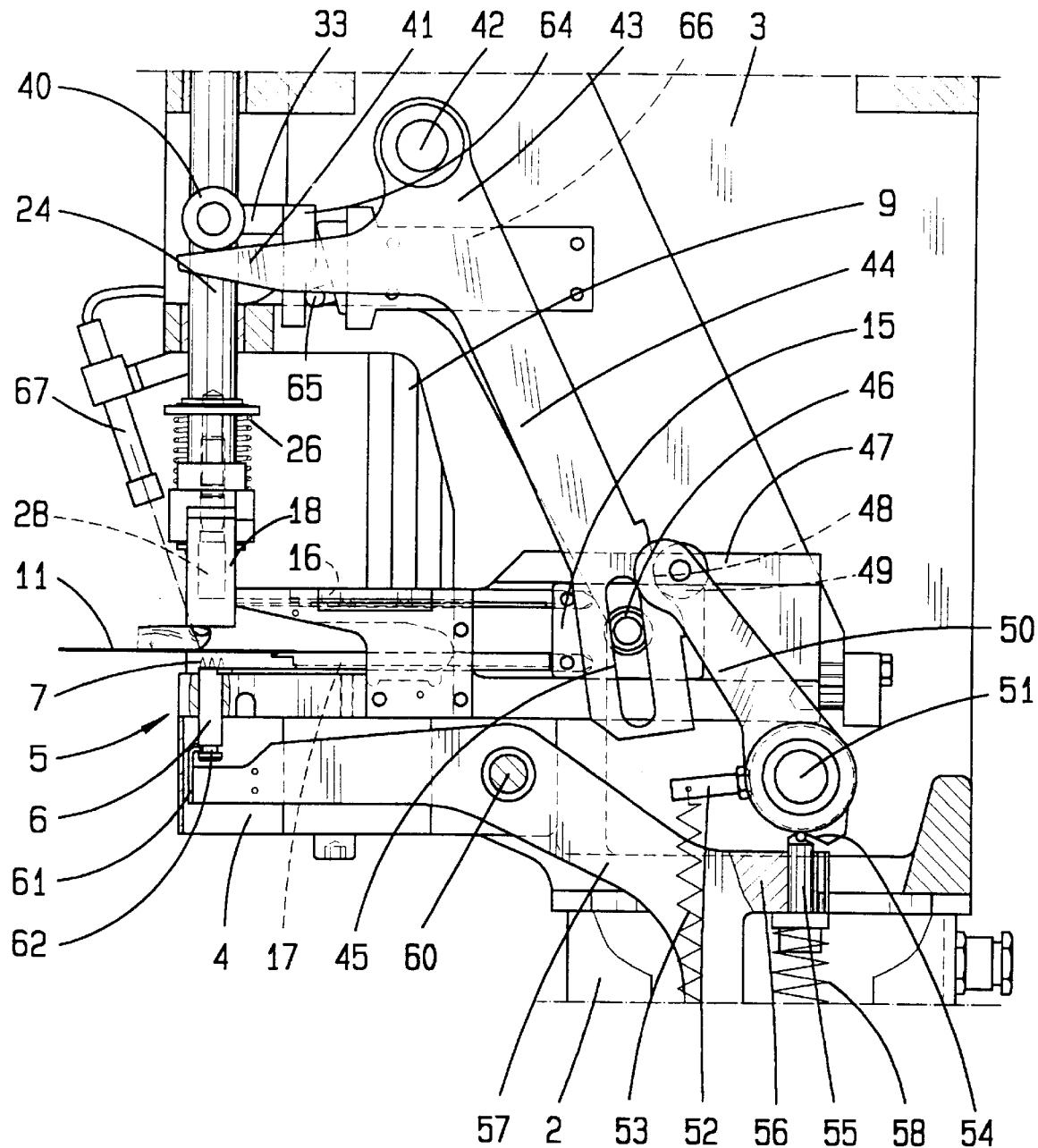
FIG. 6 shows the corresponding part enlargement in this position.
Figure 7:
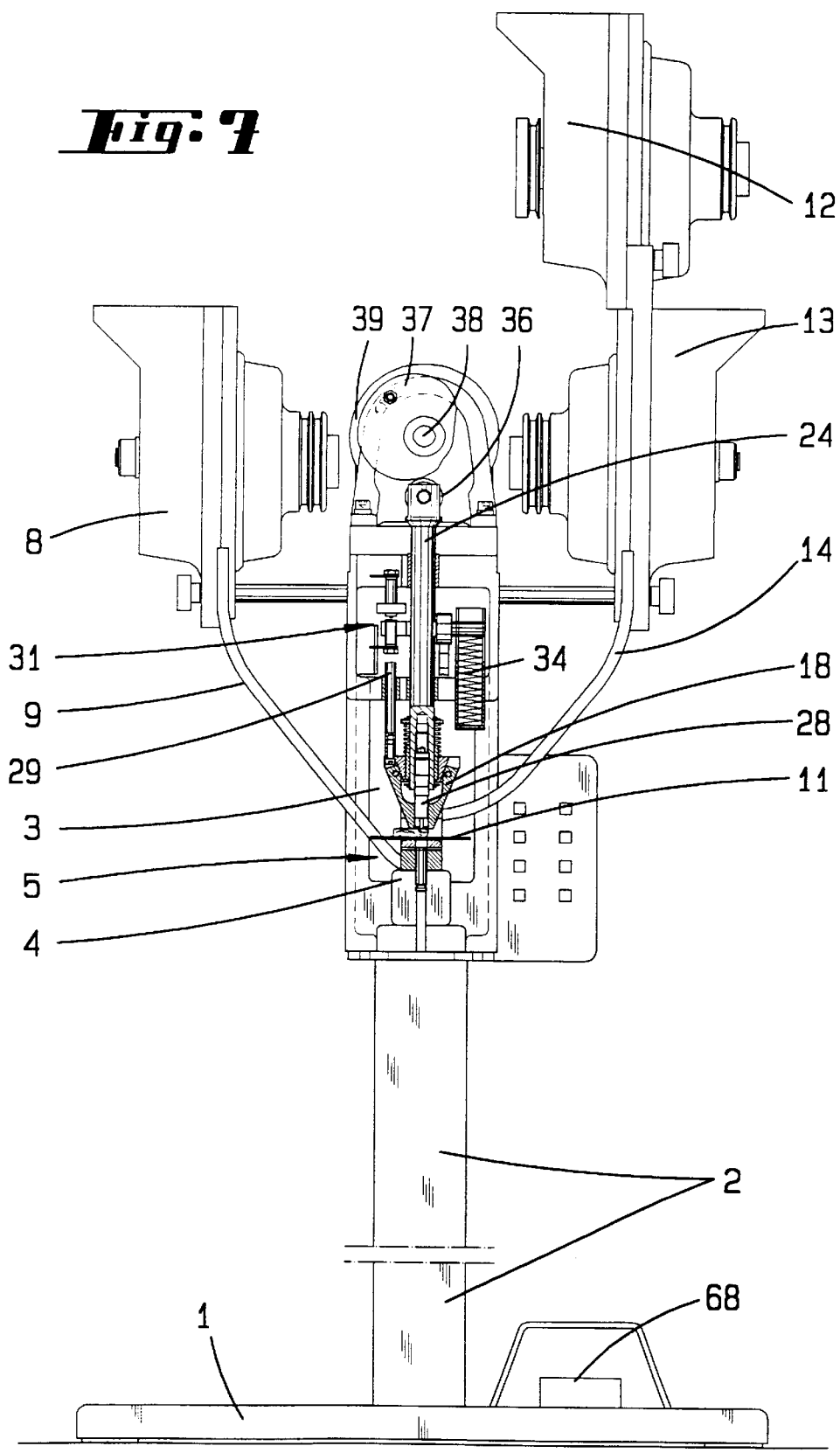
FIG. 7 shows the front view of the device for this position of the jaws.
Figure 8:
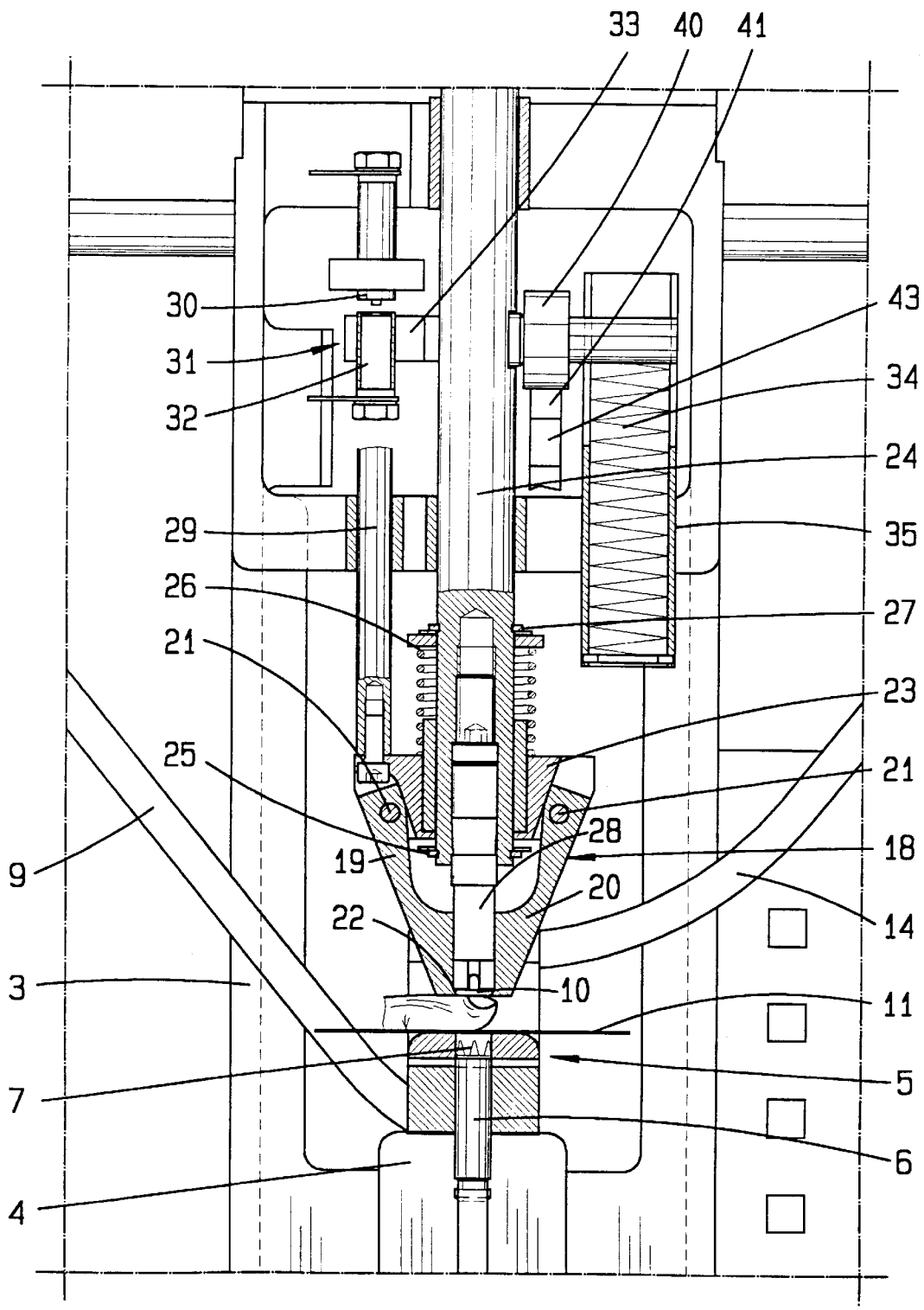
FIG. 8 shows the enlargement of part of the front view in the region of the tools, likewise with a finger extending between jaws and lower tool.
Figure 9:
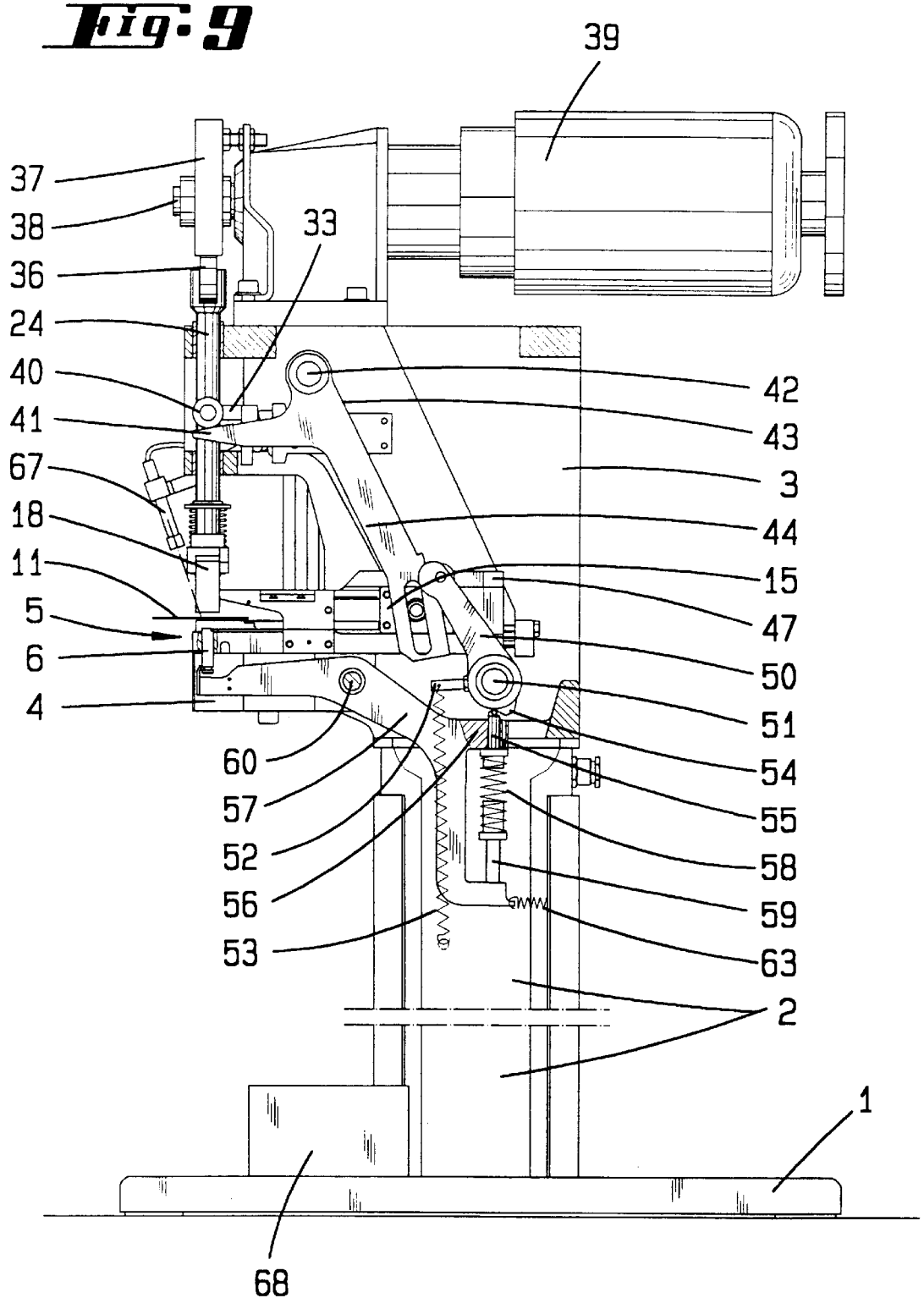
FIG. 9 shows a representation similar to FIG. 1, after execution of a first lowering movement of the jaws, with the position spaced from the lower tool being reached.
Figure 10:
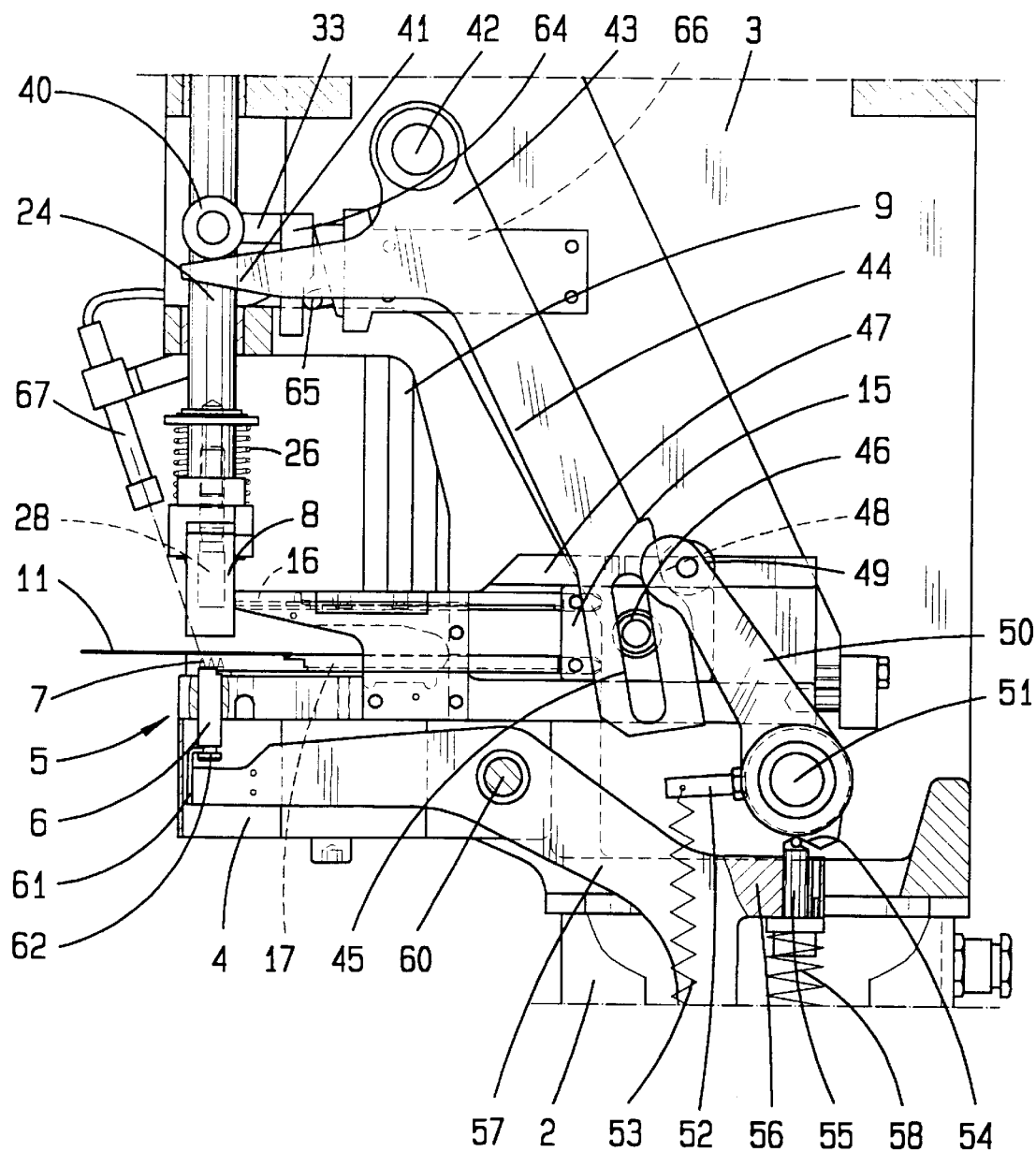
FIG. 10 shows, in connection with FIG. 9, the partial enlargement for the spaced position of the jaws from the lower tool.
Figure 11:
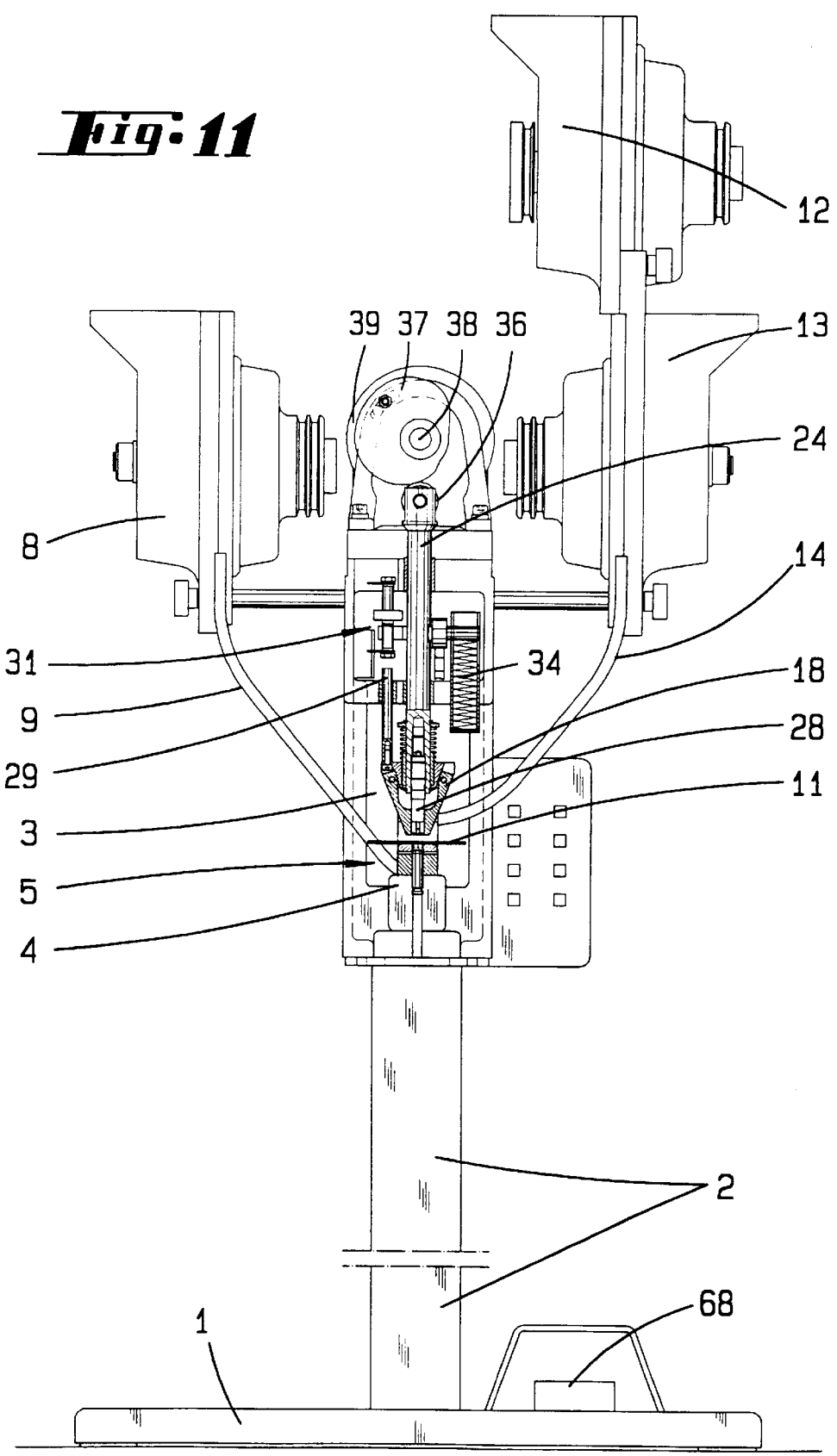
FIG. 11 shows a representation corresponding to FIG. 3, the jaws having reached their finger protecting spaced position.
Figure 12:
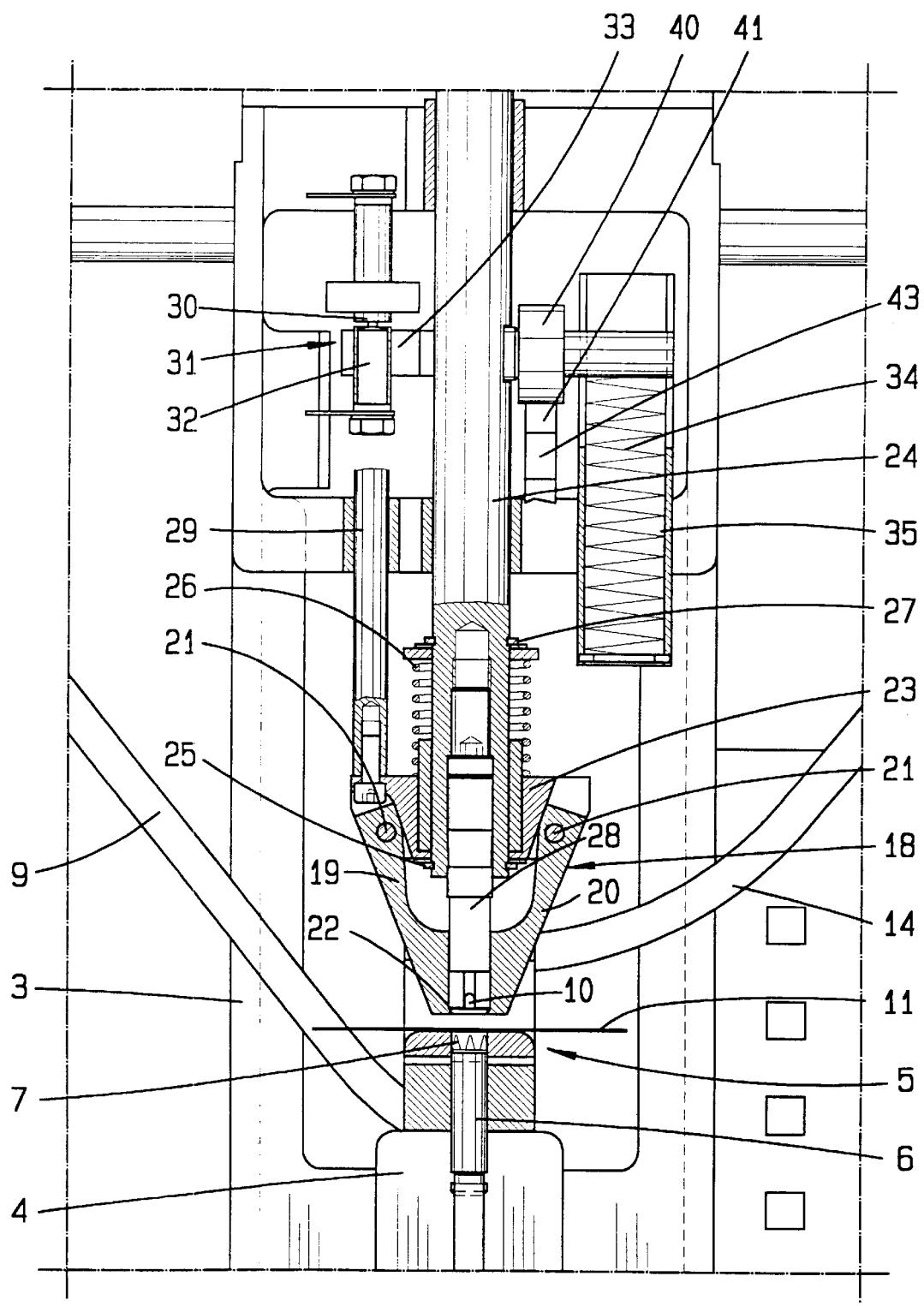
FIG. 12 shows the enlargement of part of FIG. 11 in the region of the tools.
Figure 13:
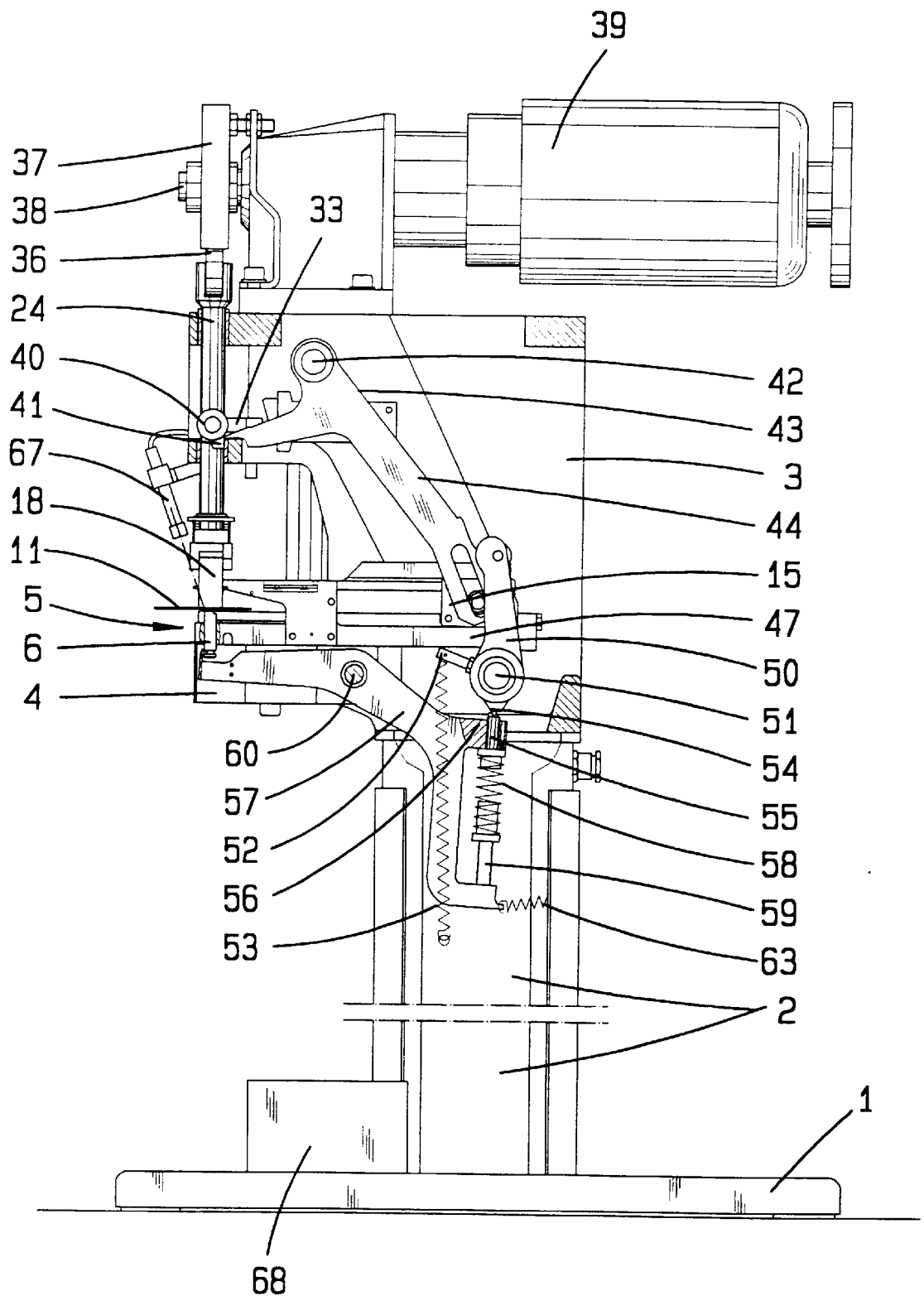
FIG. 13 shows the representation corresponding to FIG. 1, but with tools taking up the riveting position.
Figure 14:
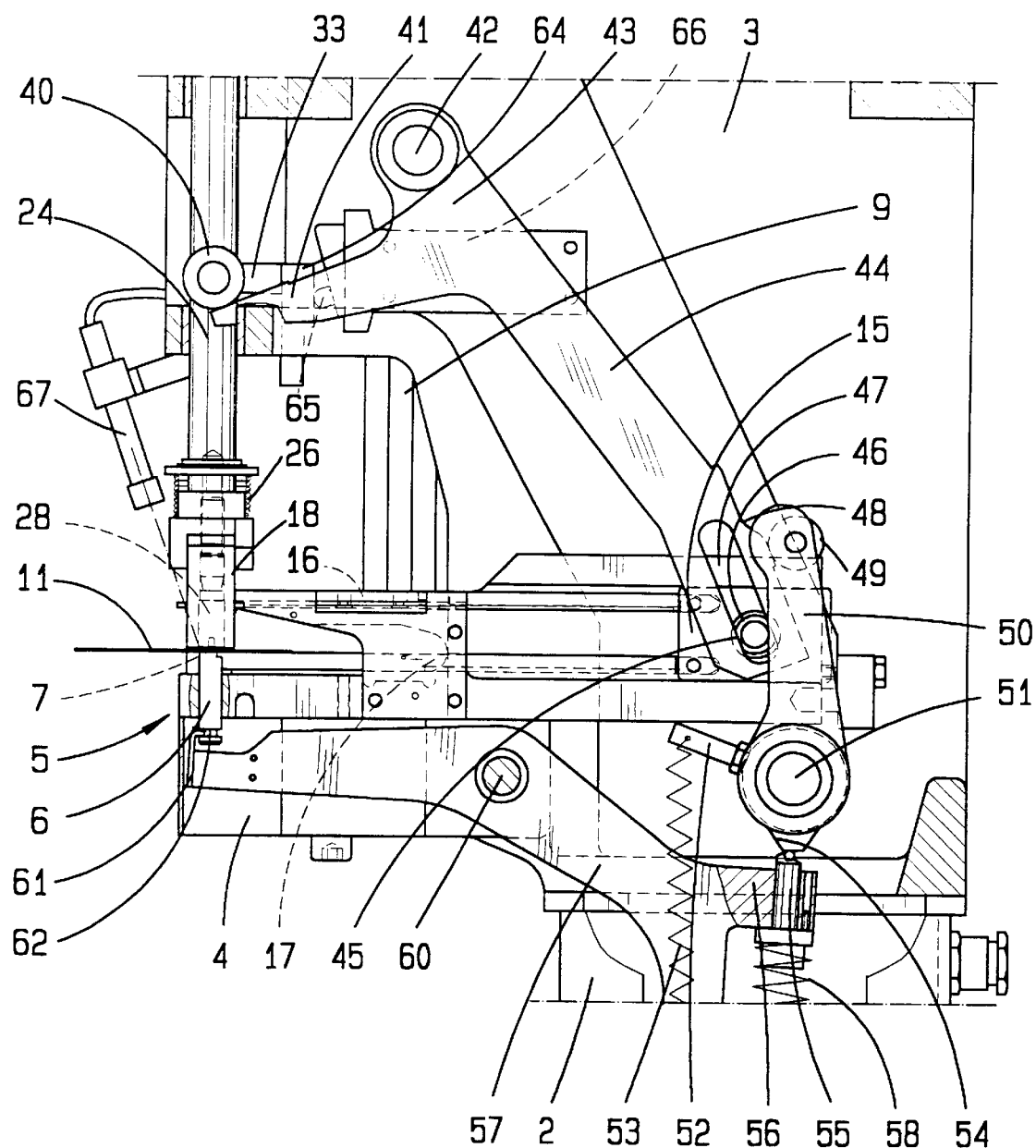
FIG. 14 shows the enlargement of part of FIG. 13 in the region of the tools.
Figure 15:
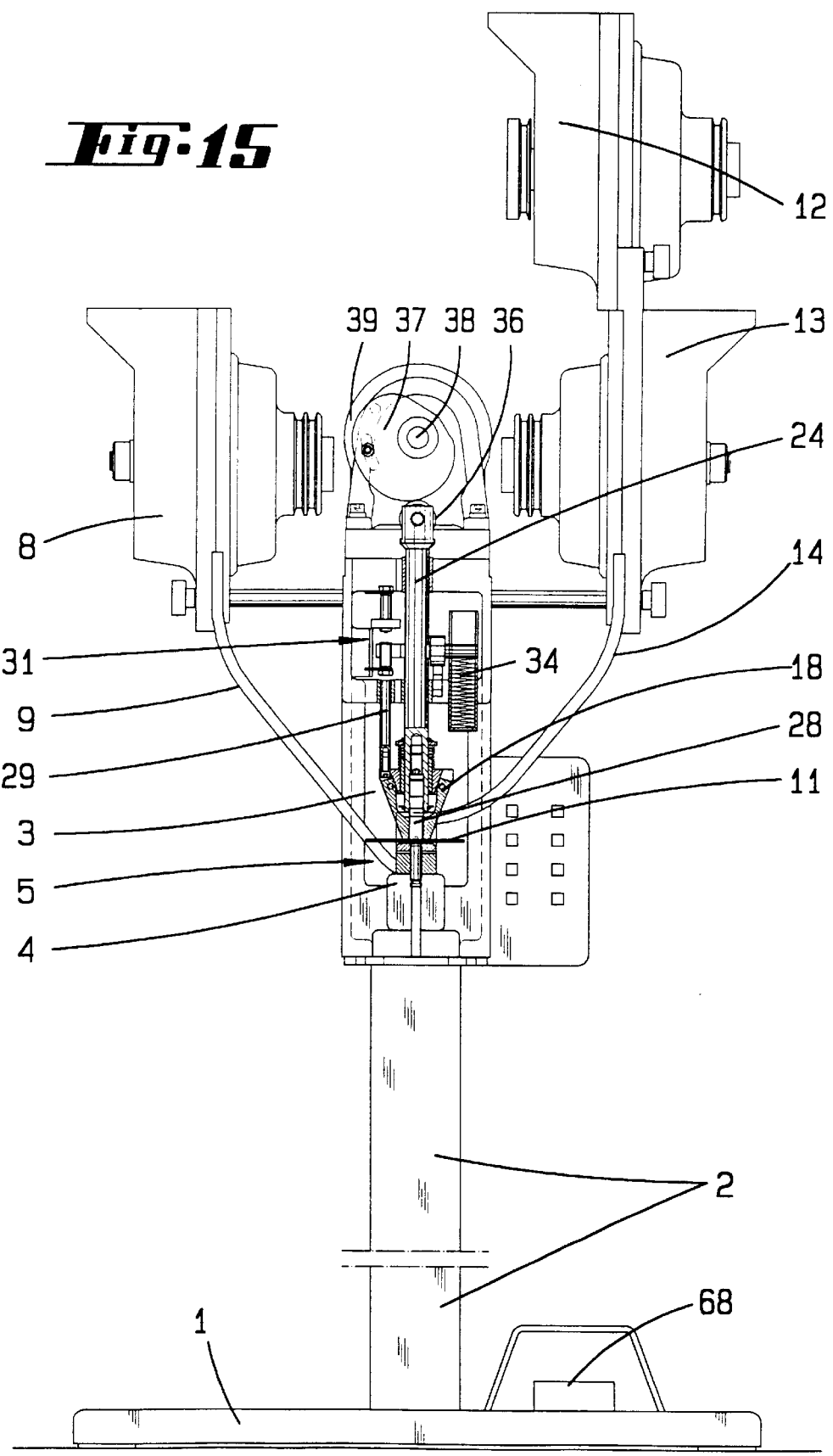
FIG. 15 shows the front view of the device, partially in section, in the riveting position.
Figure 16:
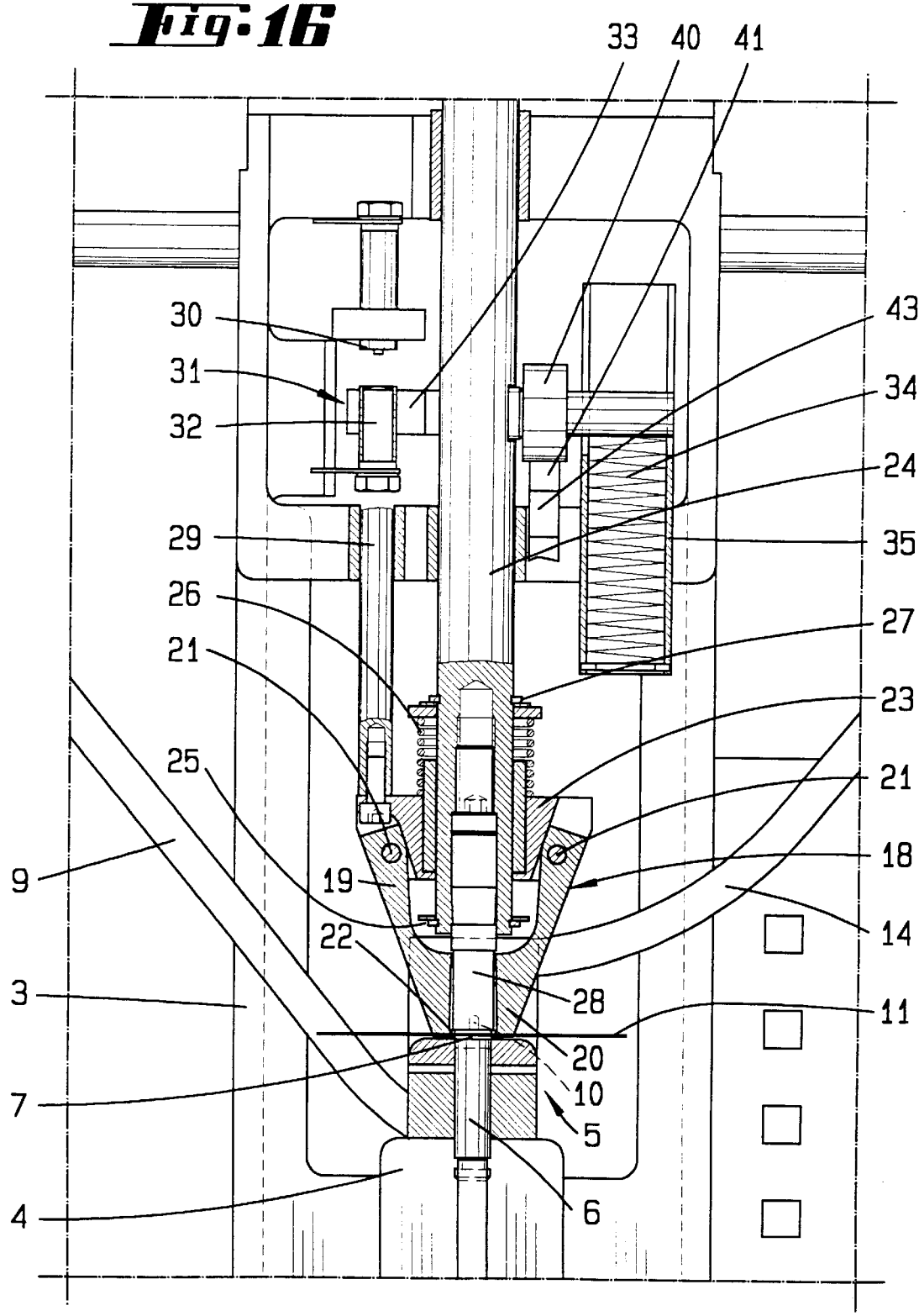
FIG. 16 shows the associated enlargement of part of FIG. 15 in the region of the tools.

By actuation of a foot switch 68 disposed on the base plate 1, the drive starts, combined with a rotation of the cam disc 37 in the direction of the arrow of FIG. 3. The ram 24 is downwardly displaced by this. From the movement diagram of FIG. 17, it is to be seen that the ram 24 (see ram curve I) stops after a 60° rotation of the drive cam. This standstill condition extends up to approximately the 90° position of the drive cam 37. The jaws 18 have been displaced downwards in an identical movement, see, for this purpose, the jaws curve II in FIG. 17. The jaws 24 are disposed, accordingly, at a position spaced from the lower tool 5, which spacing is approximately 4–5 mm and is thus less than the thickness of a finger, see, for this purpose, FIGS. 9–12. The contacts 30, 32 of the switch 31 remain closed, because no relative displacement has taken place between the jaws and ram 24.

The situation may occur, however, in which the finger of an operative is extended between the lower tool 5 and the jaws 18, see FIGS. 5–8. The jaws 18 thus engage the finger, stop while the ram 24 is displaced further downwards. As a result of the displacement of ram 24 relative to the jaws 18 which then occurs, the contacts 30, 32 of the switch 31 open and immediately stop the drive. During this relative displacement of jaws 18 and ram 24, the helical compression spring 26 is only loaded to a negligible extent, so that there exists no risk of the finger being injured.

Along with the downward movement of the ram 24, the drive roller 40 impinges upon the arm 41 of the lever 43 and pivots this lever in anticlockwise direction, combined with entrainment of the loading slide 15 which has the push bars 16, 17 located thereon. The lever arm 44 of the lever 43 impinges, during this operation, against the follower roller 49 of the drive lever 50 and thus pivots the drive lever 50 clockwise, so that the follower pin engages against the drive cam 54. The transfer lever 57 is thus pivoted by means of the transfer spring 58, so that an upward movement of the lower tool 5 ensues substantially simultaneously with the jaws 18 and the ram 24 being at a standstill. The lower-tool curve III shows the upward movement of the lower tool in a slight rise, which begins approximately at 50° and ends approximately at 130°, in relation to the rotation of the cam disc 37.

When a 90° rotational position of the cam disc 37 is reached, there starts the second lowering movement of the ram 24 and thus of the jaws 18. The jaws 18 are applied to the upper side of the fabric 11, while the ram 24 is moved further downwards. The application of the jaws takes place, according to the movement diagram, at approximately 125°. The ram moving further downwards results in a relative displacement between jaws 18 and ram 24, combined with opening of the switch 31. However, the drive is not stopped, because the by-pass switch 66 on the machine stand is actuated by the drive strip 64. This is effected by the ram at the beginning of the second lowering movement, so that despite opened contacts 30, 32 of the switch 31, the drive is not interrupted. The riveting of the article lower-portion 7 to the article upper-portion 10 takes place in the region between the 180° to 200° rotation, see FIGS. 13–16. The movement diagram in FIG. 17 indicates, with reference to the lower-tool curve III, that a steeply rising upward movement occurs after the gently rising upward positioning movement up to approximately 125° rotation of the cam disc 37. The serrations of the article lower-portion 7 thus penetrate the fabric 11. The highest position of the lower tool 5 is then maintained approximately over 70° within a 360° rotation of the cam disc 37, the riveting of the button portions also taking place simultaneously. In the riveting position, the loading slide 15 has been further displaced so far that the push bars 16, 17 are located in advance of the fed-in article portions and, on continuation of the rotation of the cam disc 37, are introduced into the tools. Proceeding from the riveting position, the different levers then also move back into their initial positions, so that the initial disposition according to FIGS. 1–4 is then again present.

It is further to be mentioned that on application of the jaws 18 to the fabric 11, the downward displacement of the ram 24 forces, by means of the upper tool, the downward displacement of the article upper-portion 10, which, by means of corresponding slopes of the jaw members 19, 20, disposed after the receiver 22, forces the jaw members 19, 20 to expand against spring bias.

With the upward movement of the ram, there closes, furthermore, the switch 31, while the by-pass switch 66 opens.

I claim:

1. A device for fitting articles including rivets, buttons and the like, which comprise an article lower-portion and an article upper-portion, to a fabric and the like, the device comprising:

a lower tool serving as an abutment for the article lower-portion;

a ram executing a riveting stroke, a lower end of the ram forming an upper tool for impinging upon the article upper-portion and for urging the article against the lower tool upon execution of the riveting stroke;

a rotatable driven cam disc, an upper end of the ram cooperating with the rotatably driven cam disc for controlling travel movement of the ram;

a clamp displaceable by the ram in a direction of and in synchronism with movement of the ram, wherein, in order to provide a finger protecting function, the device is operative to stop the clamp in a position spaced from the lower tool during a first lowering movement;

an electrical switch, and means mechanically coupled to the ram for actuating the switch during the first lowering movement, actuation of the switch stopping the device prior to advancement of the ram to a spaced position from the lower tool, the spaced position being less than the thickness of the finger, and wherein a subsequent second lowering movement of the clamp is initiated by further rotation of the cam after the spaced position is reached; and wherein the cam disc stops advancement of the ram for a period between a first and a second lowering movement, and thereafter advances the ram to take the clamp along therewith in movement synchronous with movement of the ram over its entire downward path; and a spring connected between the clamp and the ram for coupling the clamp in a single-sided free movement in relation to the ram against a force of the spring, the spring being loaded either on application of the clamp to the fabric or upon a contact with the finger for actuation of the switch to trigger the finger protecting function, loading of the spring occurring along with a relative movement between the ram and the clamp and resulting in actuation of the switch.

2. A device according to claim 1, further comprising:

contacts of the switch formed as a contact breaker are associated, on one side, with the jaws and, on another side, with the ram.

3. A device according to claim 1, wherein the spring is formed as a helical compression spring encircling the ram.

4. A device according to claim 1, further comprising:

a cam disc, and wherein the spaced position provided between the two lowering movements extends over about 30° within a 360° rotation per movement cycle of the cam disc.

5. A device according to claim 1, further comprising:

a machine stand, and a by-pass switch on the machine stand, which is actuated by the ram at the beginning of the second lowering movement.

6. A device according to claim 1, further comprising:

a loading slide, and a slide displacement of said loading slide, derived from the movement of the ram.

7. A device according to claim 6, further comprising:

a machine stand having a slide guide, a lever, and a sliding block, and the slide displacement is effected by means of said lever, which guides said sliding block in a slide slot, the sliding block being, for its part, displaceable in said slide guide of the machine stand.

8. A device according to claim 7, wherein pivoting of the lever drives a rotational movement of a drive lever for a lower-tool displacement, an arm of a transfer lever following a drive cam of the drive lever.

9. A device according to claim 8, wherein the lower tool is downwardly spring-mounted via said transfer lever.

10. A device according to claim 1, wherein an upward movement of the lower tool, toward the ram, is initiated substantially when said clamp is applied to the fabric and is terminated before a lowest position of the ram is reached.

11. A device according to claim 10, wherein a positioning movement of the lower tool is provided before the upward movement of the lower tool, substantially simultaneously with a standstill condition of the clamp and ram.

12. A device according to claim 1, wherein a slide portion of the clamp is mounted axially displaceable on the ram.

* * * * *